2 Sheets—Sheet 1.

W. A. AMBERG.

Temporary Binder.

No. 8,209. Reissued May 7, 1878.

*Witnesses.*
Jac Scheitlin.
Penn Halsted

*Inventor.*
William A. Amberg,
by John J. Halsted,
Atty.

W. A. AMBERG.
Temporary Binder.

No. 8,209. Reissued May 7, 1878.

Witnesses.
Jac. Scheitlin
Penn Halsted

Inventor.
William A. Amberg.
by John J. Halsted
Atty.

UNITED STATES PATENT OFFICE.

WILLIAM A. AMBERG, OF CHICAGO, ILLINOIS.

IMPROVEMENT IN TEMPORARY BINDERS.

Specification forming part of Letters Patent No. 92,141, dated July 6, 1869; Reissue No. 4,989, dated July 16, 1872; Reissue No. 8,209, dated May 7, 1878; application filed September 6, 1877.

*To all whom it may concern:*

Be it known that I, WILLIAM A. AMBERG, of Chicago, in the county of Cook and State of Illinois, have invented a new and useful Improved Paper Holder, File, and Binder; and I do hereby declare and make known that the following is a full, clear, and exact description of the same, reference being had to the accompanying drawings and the letters and figures marked thereon, which form part of this specification.

My invention consists in a novel device in which letters or bills or other papers may be filed and indexed, and in which they are firmly and securely held in place, and in which, when the device is filed, or when enough papers, bills, or letters are filled to form a volume, the letters, bills, or other papers may be securely bound together, either with or without the index, as hereinafter fully set forth.

To enable those skilled in the art to understand how to construct and use my said invention, I will proceed to describe the same with particularity, making reference in so doing to the aforesaid drawings, in which—

Figure 1:
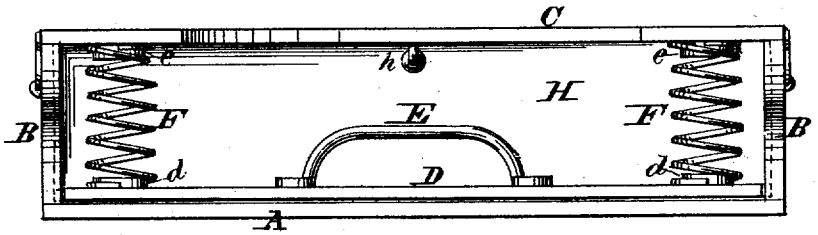
Figure 2:
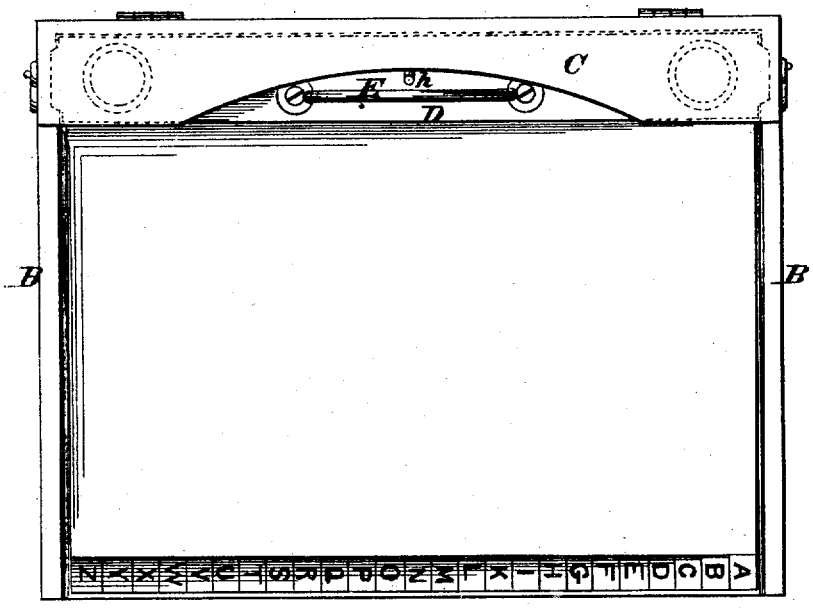
Figure 3:
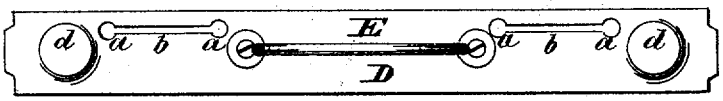
Figure 4:
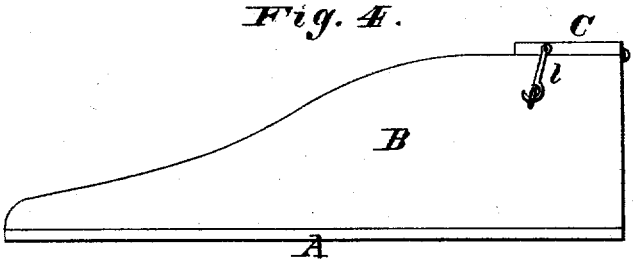
Figure 5:
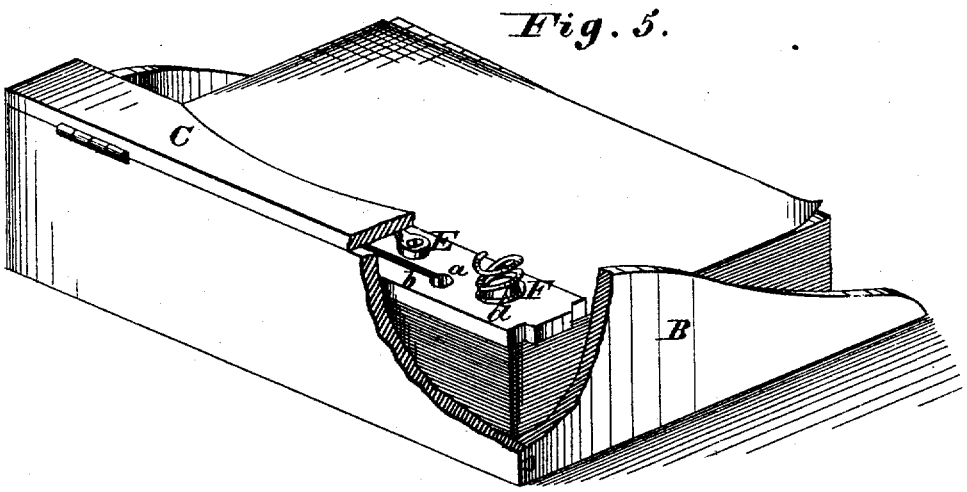
Figure 6:
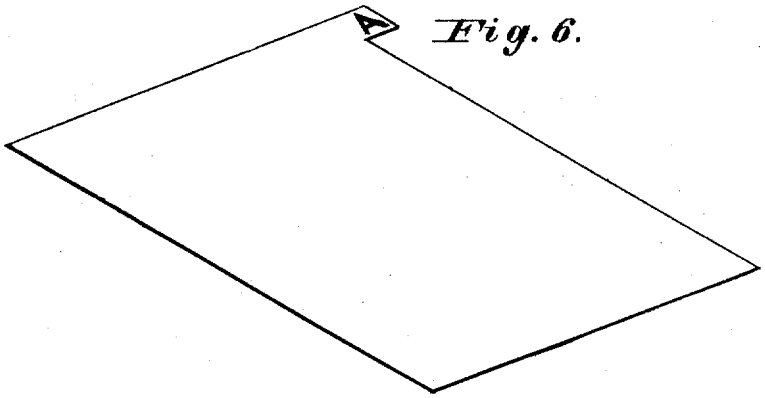
Figure 7:
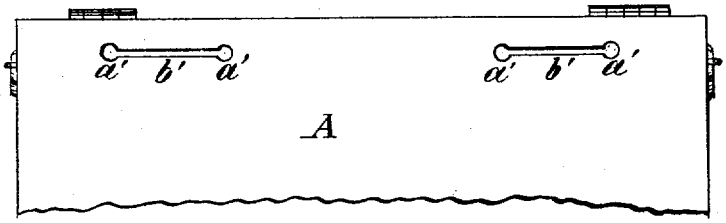

Figure 1 represents a front view or elevation of my invention. Fig. 2 is a plan or top view of the same. Fig. 3 is a top view of the pressing-bar which holds the papers in place, and Fig. 4 is a side view of said invention. Fig. 5 is a perspective view, showing more clearly the construction and utility of the unattached index; Fig. 6, one of the sheets of such index; and Fig. 7, an under-side view, showing the slots in the bottom.

Similar letters of reference in the several figures denote the same parts of my said invention.

A represents the bottom of the device, which is provided with side pieces B B and the back H, as shown, the height of the back and that part of the sides adjacent being sufficient to allow the desired number of letters, bills, or other papers to be laid in the box and below the top of the device C, which is connected to the back H by hinges, and is secured in place by means of hasps or hooks *l*, as shown in the drawings.

The width of the box is designed to be sufficient to permit ordinary letter or note paper to be laid upon the bottom lengthwise, and legal or foolscap crosswise; but the dimensions of the box are immaterial, and it may be made of any desired size.

Beneath the cover or top C is arranged a strip of wood or other material, (marked D,) upon the top of which, near each end, is a block, *d*, over which a spiral-coil spring is arranged, said blocks *d* serving to keep the springs in place, while the upper ends of said springs are retained in place by means of similar blocks *e* upon the under side of the top piece C, as shown. Instead of said springs, springs of rubber or conical-coil springs may be used, secured in position in any suitable manner. The said springs tend to press the bar D down upon whatever may be placed beneath it, and is provided with a handle, whereby it may be raised up, which handle may be passed over a hook, *h*, and held up when desired. In said bar, and also in the bottom directly beneath, are slots *b b*, whose ends are formed with enlargements *a a*, for the purpose of facilitating the binding of the files contained in the holder when desired, as hereinafter described. In the said box is a series of card-board sheets, indexed, as shown, between which, under appropriate letters, the letters, bills, or other papers may be placed, to facilitate reference thereto when desired.

The papers are placed in the holder between the appropriate boards, one edge being firmly pressed up against the back piece H, and being otherwise adjusted so as to present uniform and even edges against the side pieces B. Thus the papers may be filed and held in place by means of the pressing-bar D until the holder is full, when the index-sheets may, if desired, be withdrawn, and the entire contents of the file be bound together and removed, ready for another set or series.

To bind the files, the hooks *l* are detached, and the cover C thrown back upon its hinges, when perforations are made by passing an awl through the holes *a*, through which tapes are passed and drawn down through the bottom and tied, the tapes passing through the slots *b*, when the bar D is removed, and the file, properly and securely bound, is taken out, as aforesaid.

Instead of the arrangement herein shown, the springs may be so arranged as to operate in connection with the side pieces B, in which case the cover or top C may be dispensed with; or said springs may operate against lugs formed upon the top of the back H or sides B.

If preferred, the side pieces B B may be dispensed with, as the only service which they perform is to keep the edges of the letters or other papers filed even and straight.

Having described the construction and operation of my invention, I will specify what I claim and desire to secure by Letters Patent:

1. The paper-holder having a fixed bottom and back, unattached index-sheets, and binding-cord openings, constructed and operating substantially as shown and described.

2. A paper-holding case having end guides, in combination with an expansible set of index-leaves, constructed and operating substantially as specified.

3. The expansible index, composed of unattached sheets having uncovered index-letters, between which appropriate matter can be placed to facilitate reference thereto, substantially as described.

WILLIAM A. AMBERG.

Witnesses:
JOSEPH H. GUNDRY,
JOHN GRAY.